(12) United States Patent
Fujita et al.

(10) Patent No.: US 9,863,803 B2
(45) Date of Patent: Jan. 9, 2018

(54) OPTICAL PROCESSING HEAD HAVING A PLURALITY OF OPTICAL FIBERS ARRANGED TO SURROUND THE LIGHT GUIDE AND 3D SHAPING APPARATUS

(71) Applicant: TECHNOLOGY RESEARCH ASSOCIATION FOR FUTURE ADDITIVE MANUFACTURING, Tokyo (JP)

(72) Inventors: Yoshihito Fujita, Ritto (JP); Saneyuki Goya, Yokohama (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 57 days.

(21) Appl. No.: 14/763,153

(22) PCT Filed: Mar. 10, 2015

(86) PCT No.: PCT/JP2015/056929
§ 371 (c)(1),
(2) Date: Jul. 23, 2015

(87) PCT Pub. No.: WO2016/143055
PCT Pub. Date: Sep. 15, 2016

(65) Prior Publication Data
US 2017/0038249 A1 Feb. 9, 2017

(51) Int. Cl.
*G02B 6/36* (2006.01)
*G01J 1/04* (2006.01)
(Continued)

(52) U.S. Cl.
CPC .......... *G01J 1/0425* (2013.01); *B23K 26/032* (2013.01); *B23K 26/1462* (2015.10);
(Continued)

(58) Field of Classification Search
CPC ...... G02B 6/262; G02B 23/26; G02B 6/3604; G02B 6/3624; G02B 23/243;
(Continued)

(56) References Cited

U.S. PATENT DOCUMENTS 4,594,504 A * 6/1986 Coursolle .............. G02B 6/266
250/227.21
4,622,971 A 11/1986 Yamamoto et al.
(Continued)

FOREIGN PATENT DOCUMENTS

EP 0 350 942 A1 1/1990
EP 0 554 523 A1 8/1993
(Continued)

OTHER PUBLICATIONS

Japanese Office Action dated Jul. 12, 2016 for Japanese Application No. 2015-540772 with English translation.
(Continued)

*Primary Examiner* — Que T Le
(74) *Attorney, Agent, or Firm* — Ladas & Parry LLP

(57) ABSTRACT

This invention is directed to reliably condensing weak light by a sensor arranged at a position spaced apart from a processing position. The optical processing head includes a light guide that guides light for irradiating a processing position. The optical processing head further includes a light transmitter that has one end arranged near the distal end of the light guide and the other end connected to a photodetector, condenses reflected light traveling from the processing position, and transmits it to the photodetector. The optical processing head includes at least one light transmitter as its feature.

7 Claims, 4 Drawing Sheets

(51) Int. Cl.
*G01J 1/02* (2006.01)
*B23K 26/03* (2006.01)
*B23K 26/14* (2014.01)

(52) U.S. Cl.
CPC ........... *G01J 1/0266* (2013.01); *G01J 1/0422* (2013.01); *G02B 6/3624* (2013.01)

(58) Field of Classification Search
CPC .... G02B 6/0006; G02B 6/04; G02B 6/02042; G02B 6/06; G02B 6/3885; G01J 1/0422; G01J 1/0425; G01J 3/0208; G01J 1/0266
USPC ........................................ 250/227.11, 227.14
See application file for complete search history.

(56) References Cited

U.S. PATENT DOCUMENTS

| | | | |
|---|---|---|---|
| 4,689,485 A * | 8/1987 | McMurtry | G01D 5/34723 250/226 |
| 5,045,668 A | 9/1991 | Neiheisel et al. | |
| 5,334,816 A | 8/1994 | Sugiyama | |
| 7,748,979 B2 * | 7/2010 | Nahlieli | A61B 1/247 433/102 |
| 8,546,722 B2 | 10/2013 | Yamada et al. | |
| 2009/0127233 A1 | 5/2009 | Asano et al. | |
| 2010/0111744 A1 | 5/2010 | Schleiss et al. | |
| 2012/0175353 A1 | 7/2012 | Birnesser et al. | |

FOREIGN PATENT DOCUMENTS

| | | |
|---|---|---|
| EP | 2 329 907 A1 | 6/2011 |
| JP | 58-143745 A | 8/1983 |
| JP | 63-80087 U | 5/1988 |
| JP | 5-138375 A | 6/1993 |
| JP | 5-212568 A | 8/1993 |
| JP | 9-10970 A | 1/1997 |
| JP | 2001-239388 A | 9/2001 |
| JP | 2008-546536 A | 12/2008 |
| JP | 2009-125756 A | 6/2009 |
| JP | 2010-201489 A | 9/2010 |
| JP | 2012-6036 A | 1/2012 |
| JP | 2012-71340 A | 4/2012 |
| JP | 2012-512031 A | 5/2012 |
| JP | 2013-233593 A | 11/2013 |
| JP | 2015-13292 A | 1/2015 |

OTHER PUBLICATIONS

Espacenet English abstract of JP 2001-239388 A, 2001.
J-PlatPat English abstract of JP 5-138375 A, 1993.
J-PlatPat English abstract of JP 9-10970 A, 1997.
European Search Report (ESR) dated Mar. 16, 2017 for EP Application No. 15762906,4.
Espacenet English abstract of EP 0 350 942 A1.
International Search Report dated Jun. 3, 2015 for Application No. PCT/JP2015/056929.
J-PlatPat English abstract of JP 2012-71340 A.
J-PlatPat English abstract of JP 5-212568 A.
J-PlatPat English abstract of JP 2010-201489 A.
J-PlatPat English abstract of JP 2012-6036 A.
J-PlatPat English abstract of JP 2013-233593 A.
J-PlatPat English abstract of JP 2015-13292 A.
J-PlatPat English abstract of JP 2009-125756 A.

* cited by examiner

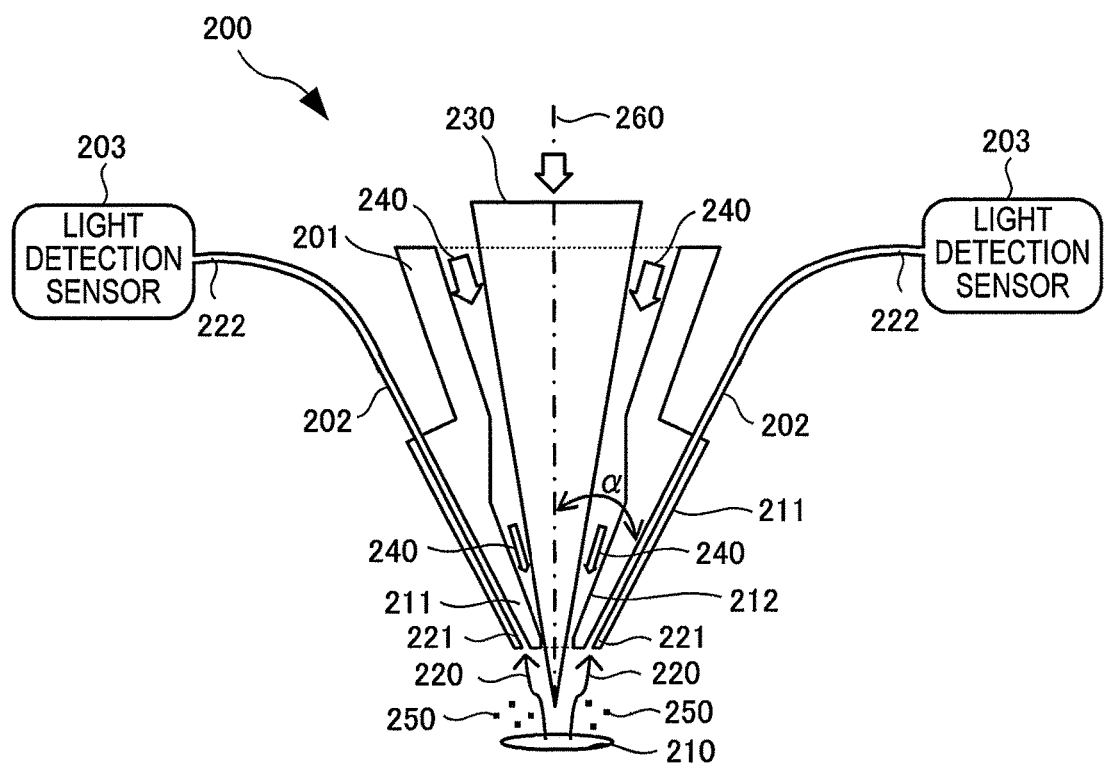
F I G. 2

OPTICAL PROCESSING HEAD HAVING A PLURALITY OF OPTICAL FIBERS ARRANGED TO SURROUND THE LIGHT GUIDE AND 3D SHAPING APPARATUS

TECHNICAL FIELD

The present invention relates to an optical processing head and a 3D shaping apparatus.

BACKGROUND ART

In the above technical field, patent literature 1 discloses a technique of arranging a sensor at a position spaced apart from a processing position, and monitoring a processing state.

CITATION LIST

Patent Literature

Patent literature 1: Japanese Patent No. 5414645

SUMMARY OF THE INVENTION

Technical Problem

In the technique described in this literature, however, it is difficult to condense weak light by the sensor arranged at the position spaced apart from the processing position.

The present invention enables to provide a technique of solving the above-described problem.

Solution to Problem

One aspect of the present invention provides an optical processing head comprising:

a light guide that guides light for irradiating a processing position; and at least one light transmitter that has one end arranged near a distal end of the light guide and another end connected to a photodetector, condenses reflected light traveling from the processing position, and transmits the reflected light to the photodetector.

Another aspect of the present invention provides a 3D shaping apparatus comprising the optical processing head.

Advantageous Effects of Invention

According to the present invention, even a sensor arranged at a position spaced apart from a processing position can reliably condense weak light.

BRIEF DESCRIPTION OF DRAWINGS

FIG. 2 is a side view showing the arrangement of an optical processing head according to the second embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

An optical processing head 100 according to the first embodiment of the present invention will be described with reference to FIG. 1. The optical processing head 100 is a device that detects reflected light traveling from a processing position, and monitors the processing quality and processing state of a shaped object.

Figure 1:
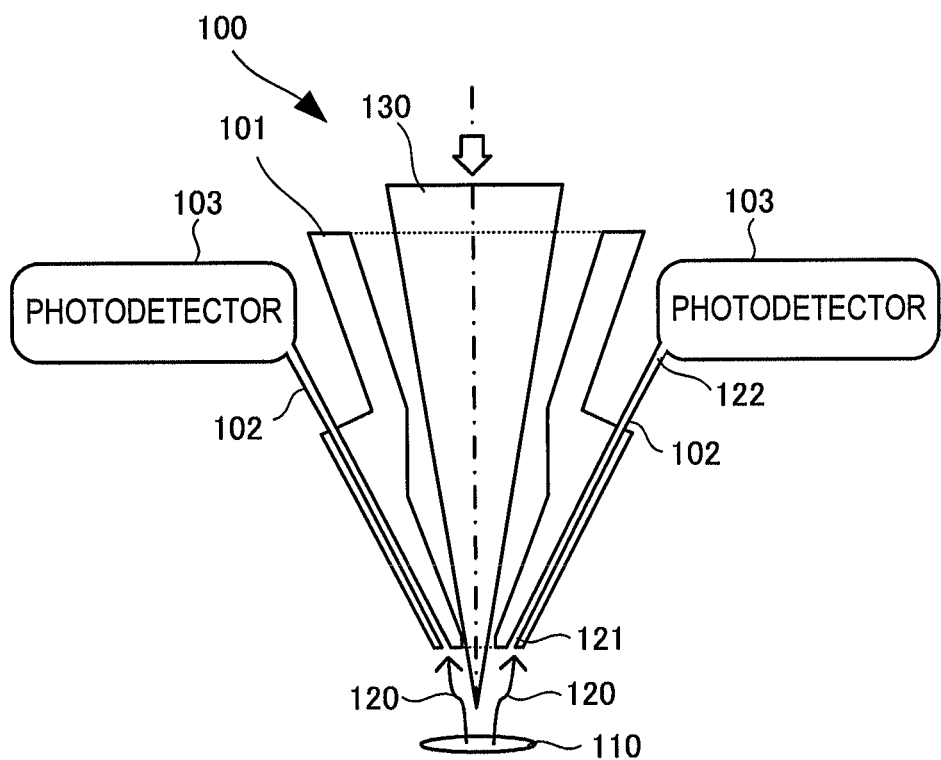
FIG. 1 is a view showing the arrangement of an optical processing head according to the first embodiment of the present invention.

As shown in FIG. 1, the optical processing head 100 includes a light guide 101, light transmitters 102, and photodetectors 103.

The light guide 101 guides light such as a laser beam 130 emitted by a light source (not shown) to a processing position 110 on a shaping surface. Each light transmitter 102 has an end 121 arranged near the distal end of the light guide 101, and another end 122 connected to the corresponding photodetector 103. The light transmitter 102 condenses reflected light 120 traveling from the processing position 110, and transmits it to the photodetector 103.

According to the first embodiment, even if the sensor is arranged at the position spaced apart from the processing position, weak light is condensed through the light transmitter and can thus be condensed reliably.

Second Embodiment

Figure 3:
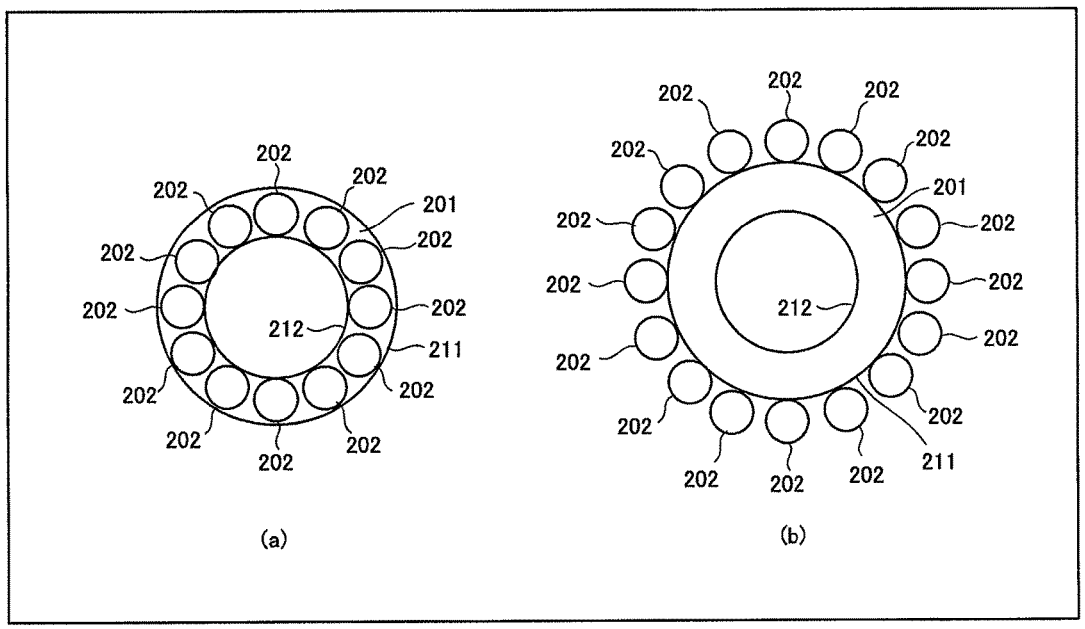
FIG. 3 is a plan view showing the arrangement of the optical fibers of the optical processing head according to the second embodiment of the present invention.

An optical processing head 200 according to the second embodiment of the present invention will be described with reference to FIGS. 2 to 4. FIG. 2 is a side view for explaining the arrangement of the optical processing head 200 according to this embodiment. FIG. 3 is a plan view for explaining the arrangement of optical fibers 202 of the optical processing head 200 according to this embodiment.

The optical processing head 200 includes a nozzle 201, the optical fibers 202, and light detection sensors 203.

The nozzle 201 irradiates a metal, resin, or the like, which is a lamination material for forming a 3D shaped object, with light such as a laser beam 230, and hardens the lamination material spread to a processing position 210. The lamination material may be spread from the nozzle 201 to the processing position 210, or may be spread from a lamination material spreading device other than the nozzle 201.

The nozzle 201 sprays a spray gas 240 from the spray port of the nozzle 201 to suppress entrance of a foreign substance such as a fume 250 into the nozzle 201.

The inner diameter of the nozzle 201 is about several mm. If the inner diameter of the nozzle 201 becomes excessively large, the spray state of the spray gas 240 becomes poor, failing in obtaining the effect of suppressing entrance of the fume 250.

This inner diameter value of the nozzle 201 is proper in terms of the process of laminating a lamination material, but the inner diameter of the nozzle 201 is preferably as large as possible in terms of monitoring the processing state and the processing quality. However, if the inner diameter becomes excessively large, the spray state of the spray gas 240 becomes poor, as described above.

Thus, the inner diameter of the nozzle 201 is preferably decided from the relationship between the beam diameter of the laser beam 230 and the spray amount of the spray gas 240. For example, the inner diameter is preferably set to prevent interference between the laser beam 230 and the spray gas 240, and its preferable value is about 3 to 5 mm. However, the inner diameter is not limited to this value.

Each optical fiber 202 has a distal end 221 arranged near the distal end of the nozzle 201. The distal end 221 of the optical fiber 202 is therefore arranged at a position corresponding to a very short distance from the processing position 210. The optical fiber 202 can reliably condense even a weak reflected beam 220.

To perform quality control of a 3D shaped object or detect generation of a trouble during the processing process, it is desirable to detect and evaluate even the weak reflected beam 220. It is advantageous to detect and evaluate the weak reflected beam 220 in order to finally implement stable processing.

For this purpose, it is desirable to collect all the reflected beams 220 including a weak beam. To collect the reflected beams 220, it is advantageous that the light detection sensors 203 are as close as possible to the processing position 210.

However, the interval between the distal end of the nozzle 201 and the processing position 210 is normally narrow, so it is physically impossible to locate the light detection sensors 203 near the processing position 210. To compensate for the interval between the processing position 210 and the light detection sensors 203, the optical fibers 220 are arranged at this position. Accordingly, even the weak reflected beam 220 can be reliably captured.

As the detailed arrangement of the optical fibers 202, they are provided between an outer wall 211 serving as the outer surface of the nozzle 201, and an inner wall 212 serving as the inner surface of the nozzle 201. That is, the optical fibers 202 are incorporated in the nozzle 201.

The distal end 221 of each optical fiber 202 is contaminated by vapor or the fume 250 produced by the laser beam 230. If the contamination is left to stand, the optical fiber 202 may not be used any more owing to aging.

In this embodiment, therefore, the optical fibers 202 are incorporated in the nozzle 201 to suppress attachment of the fume 250. Each optical fiber 202 has a rear end 222 connected to the corresponding light detection sensor 203.

The optical fiber 202 condenses the reflected beam 220 such as a plasma beam that is reflected and radiated at the processing position 210. The optical fiber 202 transmits the condensed reflected beam 220 to the light detection sensor 203 connected to the rear end 222 of the optical fiber 202.

The optical fiber 202 is inclined at a predetermined angle (α) with respect to an optical axis 260 of the laser beam 230. This can suppress entrance of a foreign substance such as the fume 250 into the optical fiber 202. Note that the optical fiber 202 may be parallel to the optical axis 260, that is, the inclination with respect to the optical axis 260 may be 0°.

Each light detection sensor 203 is, for example, a spectrometer. The light detection sensor 203 may be a sensor capable of detecting light in a wide wavelength range from visible light to 1 µm, or to the contrary may be a sensor that detects only light of a specific wavelength.

For example, if the detection target beam is a reflected beam of the laser beam 230, the light detection sensor 203 suffices to be a sensor capable of detecting light in a wavelength range in the same 1-µm unit as that of the laser beam 230. If the detection target beam is a reflected beam of plasma emission, the light detection sensor 203 suffices to be a sensor capable of detecting light in a wavelength range of 700 nm to 900 nm.

The light detection sensor 203 is desirably, for example, a sensor that detects the wavelength of light and measures a temperature at the processing position 210 or the like based on the detected wavelength, or a sensor capable of real-time detection.

By using the light detection sensor 203, the temperature and the state at the time of melting can be confirmed. The soundness of the lamination process can also be confirmed. In addition, various kinds of information can be fed back. The processing quality can also be monitored during processing by the laser beam 230.

Since the weak reflected beams 220 can be detected, their data are fed back to a control device (not shown) and fine control of the output (power) of the laser beam 230 becomes possible. For example, the following control is performed when the temperature at a portion (processing position 210) where the lamination material is melted is to be maintained at 1,000 to 1,100° C.

When the wavelength of the detected reflected beam 220 reveals that the temperature at the processing position 210 is 900° C., it is controlled to increase the output (power) of the laser beam 230 and raise the temperature at the processing position 210. In contrast, when the temperature at the processing position 210 is 1,100° C. or more, it is controlled to decrease the output (power) of the laser beam 230 and decrease the temperature at the processing position 210.

An optical system such as a condenser lens may be further provided between the light detection sensor 203 and the rear end 222 of the optical fiber 202. Since this additional optical system can amplify a weak beam, the light detection sensor 203 can more reliably detect even the weak reflected beam 220.

FIG. 3 is a plan view for explaining the arrangement of the optical fibers 202 of the optical processing head 200 according to this embodiment. In FIG. 3, (a) shows an arrangement in which the optical fibers 202 are incorporated between the outer wall 211 and inner wall 212 of the nozzle 201, as described in FIG. 2. In contrast, the optical fibers 202 may not be incorporated in the nozzle 201, but may be attached to the outer wall 211 serving as the outer surface of the nozzle 201, as shown in (b) of FIG. 3.

For example, when the optical fibers 202 are provided on the entire circumference of the inner wall 212 or outer wall 211 of the nozzle 201, as shown in FIG. 3, even directional light can be detected. The number of optical fibers 202 is not particularly limited.

According to the second embodiment, even if the light detection sensor 203 is arranged at the position spaced apart from the processing position 210, weak light can be reliably condensed. Since the optical fibers 202 are arranged to surround the entire circumference of the nozzle 201, even the directional reflected beam 220 can be reliably detected. The accuracy and reliability of detected data can therefore be improved.

Third Embodiment

The optical fiber of an optical processing head according to the third embodiment of the present invention will be described with reference to FIG. 4. FIG. 4 is a partial enlargement view showing an optical fiber 400 of an optical processing head 200 according to this embodiment. The optical fiber 400 corresponds to the distal end of an optical fiber 202 shown in FIG. 2. The optical fiber 400 according to the third embodiment is different from the optical fiber according to the second embodiment in that it includes a cover glass and a condenser glass. The remaining arrangement and operation are the same as those in the second embodiment, so the same reference numerals denote the same arrangement and operation and a detailed description thereof will not be repeated.

Figure 4:
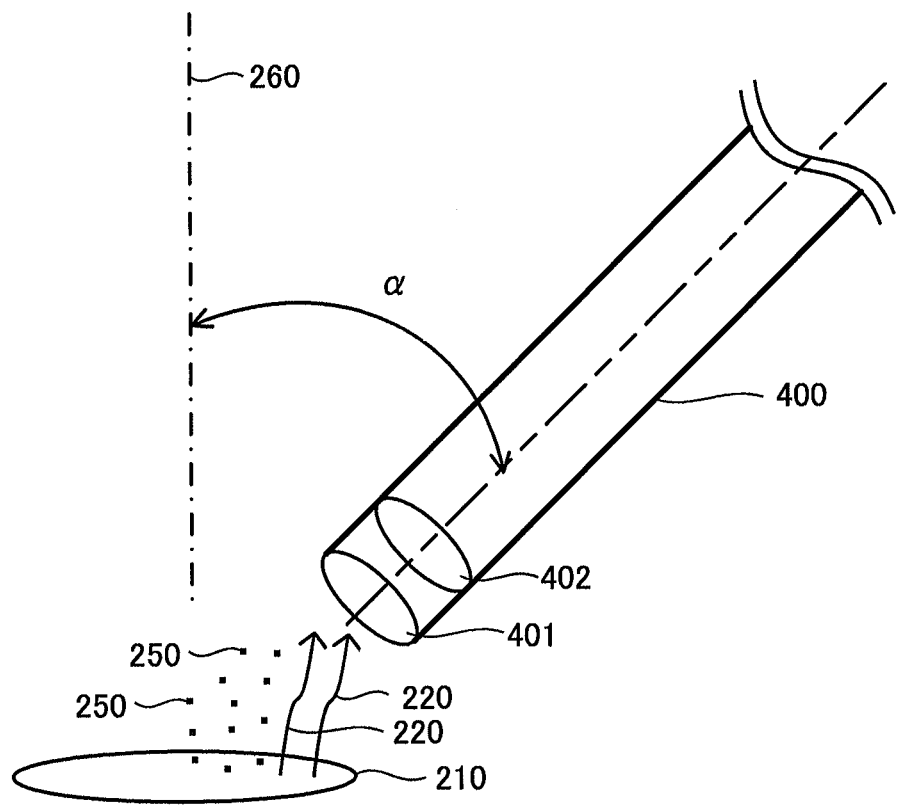
FIG. 4 is a partial enlargement view showing the optical fiber of an optical processing head according to the third embodiment of the present invention.

As shown in FIG. 4, the optical fiber 400 is inclined at a predetermined angle (α) with respect to an optical axis 260, thereby suppressing entrance of a foreign substance such as a fume 250 into the optical fiber 202.

A cover glass 401 is provided at a distal end 221 of the optical fiber 400. For example, when the output (power) of a laser beam 230 is large and a large amount of foreign substance such as the fume 250 or vapor is generated, the effect of suppressing entrance of a foreign substance into the optical fiber 400 is insufficient in the above arrangement. In this case, the entrance of the foreign substance can be effectively suppressed by providing the cover glass 401.

By providing the cover glass 401 in this manner, the cover glass 401 functions as a protector and can prevent attachment of contamination and entrance of a foreign substance.

Further, a condenser microlens 402 is provided in the optical fiber 400 and can enhance the condensing property of the optical fiber 400. Hence, even very weak light can be reliably detected.

According to the third embodiment, even if a light detection sensor 203 is arranged at a position spaced apart from a processing position 210, weak light can be reliably condensed. Since the optical fibers 202 are arranged to surround the entire circumference of the nozzle 201, even a directional reflected beam 220 can be reliably detected. The accuracy and reliability of detected data can therefore be improved.

Although not shown, the optical processing head 200 according to this embodiment can also be used in a 3D shaping apparatus such as a 3D printer.

According to the third embodiment, since the cover glass is provided to the optical fiber and can prevent entrance of a foreign substance such as the fume 250 into the optical fiber 400. Further, attachment of contamination to the optical fiber 400 can be prevented. Since the condenser lens is provided, weak light can be reliably condensed.

Other Embodiments

The present invention has been described above with reference to the embodiments. However, the present invention is not limited to those embodiments. Various changes understandable by those skilled in the art within the scope of the present invention can be made for the arrangements and details of the present invention. The present invention also incorporates a system or apparatus that somehow combines different features included in the respective embodiments.

The invention claimed is:

1. An optical processing head comprising:
   a light guide that guides light for irradiating a processing position; and
   a plurality of optical fibers that have one end arranged near a distal end of said light guide and another end connected to a photodetector, condense reflected light traveling from the processing position, and transmit the reflected light to the photodetector,
   wherein said plurality of optical fibers are arranged to surround said light guide.

2. The optical processing head according to claim 1, said plurality of optical fibers are inclined by a predetermined angle with respect to an optical axis.

3. The optical processing head according to claim 1, said plurality of optical fibers are provided between an outer surface and inner surface of said light guide.

4. The optical processing head according to claim 1, wherein said plurality of optical fibers include a cover glass provided at the one end.

5. The optical processing head according to claim 1, wherein said plurality of optical fibers include a condenser lens provided at the one end.

6. The optical processing head according to claim 1, wherein the photodetector is a spectrometer.

7. A 3D shaping apparatus comprising an optical processing head as in claim 1.

* * * * *